US012679240B2

(12) United States Patent
Ashida

(10) Patent No.: US 12,679,240 B2
(45) Date of Patent: Jul. 14, 2026

(54) VEHICLE REFERENCING SYSTEM

(71) Applicant: TOYOTA JIDOSHA KABUSHIKI KAISHA, Toyota (JP)

(72) Inventor: Hiroshi Ashida, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 18/985,320

(22) Filed: Dec. 18, 2024

(65) Prior Publication Data

US 2025/0326313 A1 Oct. 23, 2025

(30) Foreign Application Priority Data

Apr. 18, 2024 (JP) ................................. 2024-067806

(51) Int. Cl.
B60L 53/62 (2019.01)
B60L 53/66 (2019.01)
B60L 53/68 (2019.01)

(52) U.S. Cl.
CPC .............. B60L 53/62 (2019.02); B60L 53/66 (2019.02); B60L 53/68 (2019.02)

(58) Field of Classification Search
CPC ........... B60L 53/62; B60L 53/68; B60L 53/66
USPC ......................................................... 701/21
See application file for complete search history.

(56) References Cited

U.S. PATENT DOCUMENTS

2021/0086647 A1* 3/2021 Kiessling ................ B60L 53/62
2025/0018819 A1* 1/2025 Endo ....................... B60L 53/65

FOREIGN PATENT DOCUMENTS

| CN | 215751966 U | * | 2/2022 |
| JP | H05227603 A | * | 9/1993 |
| JP | 2014-039391 A | | 2/2014 |

OTHER PUBLICATIONS

Zhu, Deep Learning Based Automatic Charging Identification and Positioning Method for Electric Vehicle, Nov. 8, 2022, Tech Science Press, Computer Modeling in Engineering & Sciences (Year: 2022).*

* cited by examiner

*Primary Examiner* — Matthias S Weisfeld
(74) *Attorney, Agent, or Firm* — SoraIP, Inc.

(57) ABSTRACT

Electrified vehicle connected to external charging and discharging device is identified by referencing various information acquired from electrified vehicle with various information acquired from the external charging and discharging device. Thus, even when a plurality of external charging and discharging devices are installed in a close range, electrified vehicles connected to the external charging and discharging device can be appropriately identified. Also, when determining that the external charging and discharging device and the remaining charge in at least two electrified vehicle among electrified vehicle connected to the charging and discharging execution state are the same, the external charging and discharging device is controlled so that the charging and discharging execution state is different between electrified vehicles. Thus, electrified vehicles connected to the external charging and discharging devices can be appropriately identified, even when the charging and discharging execution state and the remaining charge of the electrified vehicles are the same.

5 Claims, 6 Drawing Sheets

Figure 5:
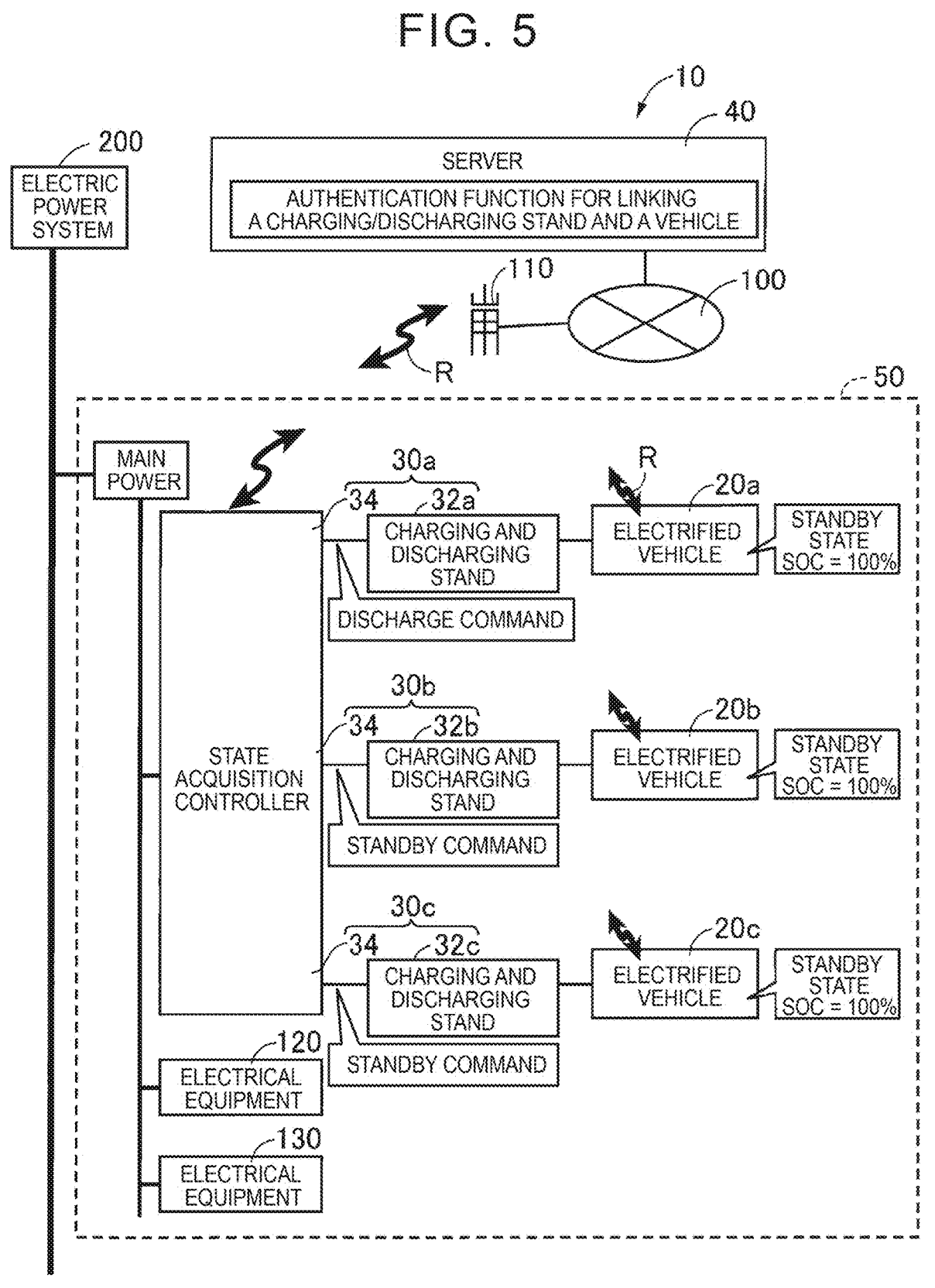

ELECTRIC
POWER
SYSTEM

SERVER

AUTHENTICATION FUNCTION FOR LINKING
A CHARGING/DISCHARGING STAND AND A VEHICLE

110

R

100

50

MAIN
POWER

STATE
ACQUISITION
CONTROLLER

30a 34    32a

CHARGING AND
DISCHARGING
STAND

DISCHARGE COMMAND

R

20a

ELECTRIFIED
VEHICLE

STANDBY
STATE
SOC = 100%

30b 34    32b

CHARGING AND
DISCHARGING
STAND

STANDBY COMMAND

20b

ELECTRIFIED
VEHICLE

STANDBY
STATE
SOC = 100%

30c 34    32c

CHARGING AND
DISCHARGING
STAND

STANDBY COMMAND

20c

ELECTRIFIED
VEHICLE

STANDBY
STATE
SOC = 100%

120

ELECTRICAL
EQUIPMENT

130

ELECTRICAL
EQUIPMENT

VEHICLE REFERENCING SYSTEM

CROSS-REFERENCE TO RELATED APPLICATION

This application claims priority to Japanese Patent Application No. 2024-067806 filed on Apr. 18, 2024, incorporated herein by reference in its entirety.

BACKGROUND

1. Technical Field

The present disclosure relates to a vehicle referencing system for identifying an electrified vehicle connected to an external charging and discharging device.

2. Description of Related Art

A vehicle referencing system that includes a plurality of electrified vehicles, each equipped with a battery for exchanging electric power with an electric motor serving as a motive power source, a plurality of external charging and discharging devices that are fixedly installed, and that enable charging and discharging of the batteries by the electrified vehicles being connected, and an external control device that is different from the electrified vehicles and the external charging and discharging devices, and that acquires various types of information from each of the electrified vehicles and the external charging and discharging devices via communication and also controls operations of the external charging and discharging devices, is well known. For example, this is an authentication system described in Japanese Unexamined Patent Application Publication No. 2014-39391 (JP 2014-39391 A). This JP 2014-39391 A discloses technology in which, when there are multiple electrified vehicles and multiple external charging and discharging devices, processing of associating the electrified vehicles and the external charging and discharging devices, i.e., identification is performed of the electrified vehicles connected to the external charging and discharging devices, based on position information of the electrified vehicles and position information of the external charging and discharging devices.

SUMMARY

Now, the technology in JP 2014-39391 A is useful when an external charging and discharging device is unable to acquire a vehicle-specific identification number from an electrified vehicle, or the like. However, when a plurality of the external charging and discharging devices are installed in a close range, the electrified vehicle that is connected to the external charging and discharging device cannot be identified simply by referencing position information. On the other hand, when various types of information include a charging and discharging execution state and a remaining charge of a battery, identifying the electrified vehicle connected to the external charging and discharging device by referencing such information is conceivable. However, when the charging and discharging execution state and the remaining charge of electrified vehicles are the same as each other, there is concern that the electrified vehicle connected to the external charging and discharging device cannot be identified.

The present disclosure has been made in view of the above circumstances, and an object thereof is to provide a vehicle referencing system capable of appropriately identifying electrified vehicles connected to external charging and discharging devices.

According to a first aspect of the present disclosure, (a) a vehicle referencing system includes a plurality of electrified vehicles, each equipped with a battery for exchanging electric power with an electric motor serving as a motive power source, a plurality of external charging and discharging devices that is fixedly installed, and that enables charging and discharging of the batteries by the electrified vehicles being connected, and an external control device that is different from the electrified vehicles and the external charging and discharging devices, and that acquires various types of information from each of the electrified vehicles and the external charging and discharging devices via communication and also controls operations of the external charging and discharging devices, in which (b) the external control device identifies the electrified vehicles that are connected to the external charging and discharging devices, by referencing connection information of connection to the external charging and discharging devices, position information of the electrified vehicles, charging and discharging execution state of the batteries, and remaining charge of the batteries, as the various types of information that are acquired from the electrified vehicles, and connection information of connection to the electrified vehicles, position information of the external charging and discharging devices, the charging and discharging execution state, and the remaining charge, as the various types of information that are acquired from the external charging and discharging devices, and (c) when the external control device determines that the charging and discharging execution state and the remaining charge of at least two electrified vehicles among the electrified vehicles that are each connected to the external charging and discharging devices are the same, the external control device controls the external charging and discharging devices such that the charging and discharging execution state is different between the electrified vehicles regarding which the charging and discharging execution state and the remaining charge are determined to be the same.

According to the first aspect, the electrified vehicles connected to the external charging and discharging devices are identified by referencing various types of information that are acquired from the electrified vehicles with various types of information that are acquired from the external charging and discharging devices. The various types of information that are acquired from the electrified vehicles are the connection information of connection to the external charging and discharging devices, the position information of the electrified vehicles, the charging and discharging execution state of the batteries, and the remaining charge of the batteries. The various types of information that are acquired from the external charging and discharging devices are the connection information of connection to the electrified vehicles, the position information of the external charging and discharging devices, the charging and discharging execution state of the batteries, and the remaining charge of the batteries. Thus, even when multiple external charging and discharging devices are installed in a close range, the electrified vehicles that are connected to the external charging and discharging devices can be appropriately identified. In addition, there are cases in which determination is made that the charging and discharging execution state and the remaining charge in at least two electrified vehicles, among the electrified vehicles that are each connected to the external charging and discharging devices, are the same. In this case, the external charging and discharging devices are controlled such that the charging and discharging execution state is different between the electrified vehicles. This enables the electrified vehicles that are connected to the external charging and discharging devices to be appropriately identified, even when the charging and discharging execution state and the remaining charge of the electrified vehicles are the same. Accordingly, the electrified vehicles that are connected to the external charging and discharging devices can be appropriately identified.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram illustrating an exemplary facility at a station; and

DETAILED DESCRIPTION OF EMBODIMENTS

Hereinafter, embodiments of the present disclosure will be described in detail with reference to the drawings.

Figure 1:
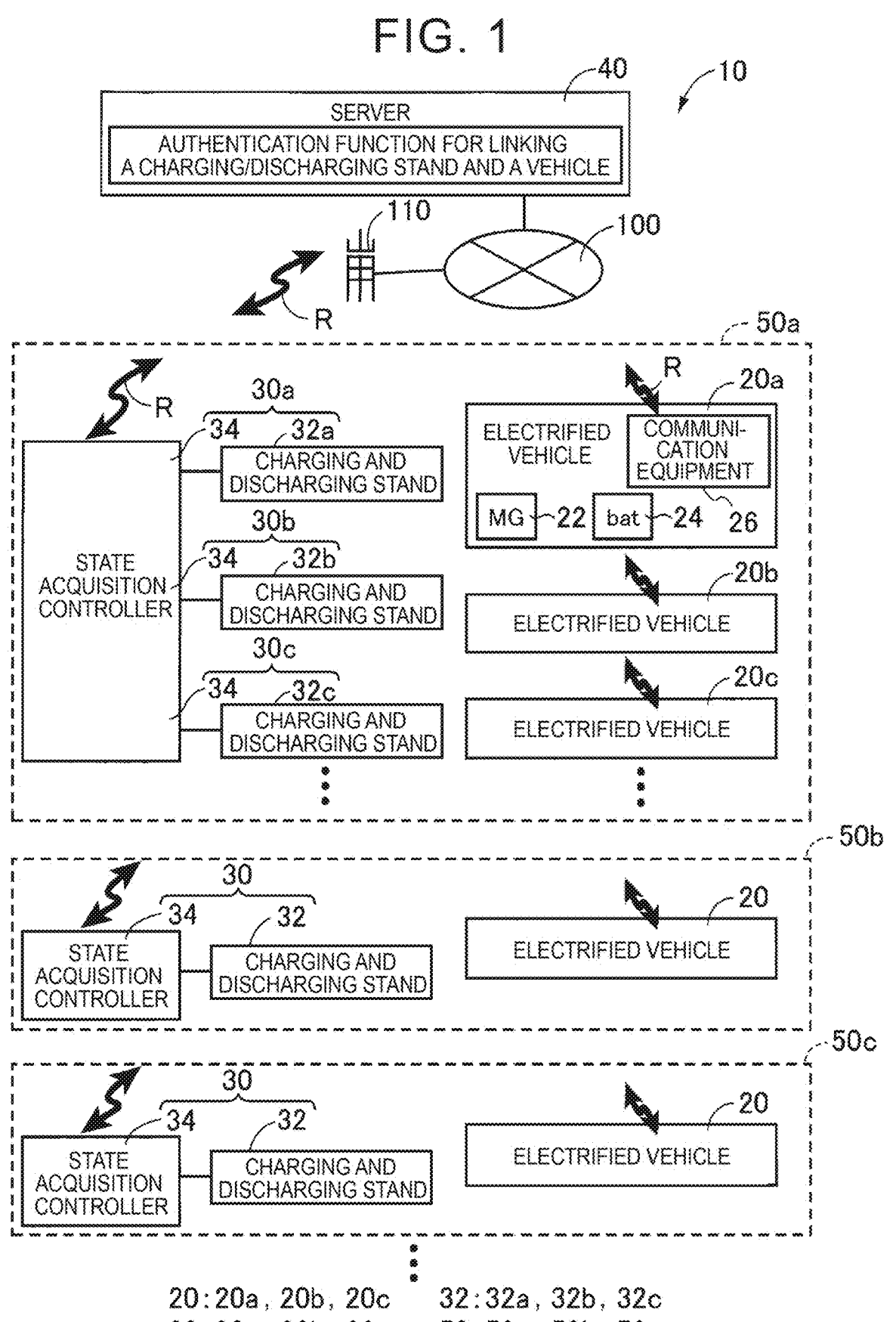
FIG. 1 is a schematic diagram illustrating a basic configuration of a vehicle referencing system according to an embodiment of the present disclosure.

FIG. 1 is a schematic diagram illustrating a basic configuration of a vehicle referencing system 10 according to an embodiment of the present disclosure. In FIG. 1, the vehicle referencing system 10 includes a plurality of electrified vehicle 20, a plurality of external charging and discharging devices 30, and servers 40.

Electrified vehicle 20 and the external charging and discharging device 30 are owned for each of the plurality of stations 50. The station 50 includes a first station 50a, a second station 50b, a third station 50c, and the like. Electrified vehicle 20 and the external charging and discharging device 30 in the second station 50b and the third station 50c are equivalent to electrified vehicle 20 and the external charging and discharging device 30 in the first station 50a. The station 50 is, for example, an electrified vehicle 20 dealer, a business office using an electrified vehicle 20, a building that manages an electrified vehicle 20, or the like.

Electrified vehicle 20 includes a first vehicle 20a, a second vehicle 20b, a third vehicle 20c, and the like. Each of electrified vehicle 20 includes an electric motor 22 that is a motive power source, a battery 24 that transmits and receives electric power to and from the electric motor 22, and a communication device 26. In electrified vehicle 20, the battery 24 can be charged and discharged by an external power supply device such as the external charging and discharging device 30, for example, in a plug-in hybrid electric vehicle (PHEV where the battery 24 having a large battery capacity [kWh] is mounted, the same battery electric vehicle (BEV is also used).

The communication device 26 exchanges various kinds of information with an in-vehicle electronic control unit (not shown) via, for example, a cable. The communication device 26 communicates with the servers 40 via a known network 100 outside electrified vehicle 20 to exchange various types of information. The communication device 26 is connected to the network 100 via wireless communication R with a wireless device 110 outside electrified vehicle 20, for example. The wireless device 110 is a transmission/reception device that is connected to the network 100 and transmits and receives various signals via the wireless communication R.

The external charging and discharging device 30 is an external power supply device fixed in the station 50 and capable of charging/discharging the battery 24 by connecting an electrified vehicle 20. The external charging and discharging device 30 includes a charging/discharging stand 32 and a state acquisition controller 34 connected to the charging/discharging stand 32 via a cable or the like. The external charging and discharging device 30 includes a first charging/discharging device 30a, a second charging/discharging device 30b, a third charging/discharging device 30c, and the like. The charging/discharging stand 32 includes a first charging/discharging stand 32a, a second charging/discharging stand 32b, a third charging/discharging stand 32c, and the like. The first charging and discharging device 30a is a combination of the first charging and discharging stand 32a and the state acquisition controllers 34. The second charging and discharging device 30b is a combination of the second charging and discharging stand 32b and the state acquisition controllers 34. The third charging and discharging device 30c is a combination of the third charging and discharging stand 32c and the state acquisition controllers 34. In the present embodiment, the plurality of charging and discharging stands 32 are combined with one state acquisition controller 34, but it is also possible to adopt a configuration in which one state acquisition controller 34 is combined with each of the plurality of charging and discharging stands 32.

The charging/discharging stand 32 is, for example, a Vehicle to Home (=V2H) stand to which electrified vehicle 20 can be charged and discharged from electrified vehicle 20 by connecting electrified vehicle 20.

The state acquisition controller 34 includes an electronic control unit (not shown) and a communication device (not shown). The state acquisition controller 34 controls charging and discharging in electrified vehicle 20 connected to the charging and discharging stand 32 by the charging and discharging stand 32. The state acquisition controllers 34 exchange various types of data with electrified vehicle 20 connected to the charging/discharging stand 32. The state acquisition controller 34 communicates with the server 40 via the network 100 to exchange various kinds of information. The state acquisition controller 34 is connected to the network 100 via, for example, wireless communication R with the wireless device 110. The state acquisition controllers 34 are, for example, Home Energy Management System (=HEMS).

The servers 40 are external control devices separate from electrified vehicle 20 and the external charging and discharging device 30 and separate from electrified vehicle 20 and the external charging and discharging device 30. The servers 40 are computers that are connected to the network 100 and include a CPU and the like. The servers 40 are connected to each of electrified vehicle 20 and the external charging and discharging device 30 via radio communication. The server 40 is a device that receives, processes, analyzes, accumulates, and provides various types of information. The servers 40 acquire various types of data from each of electrified vehicle 20 and the external charging and discharging device 30 via communication. The server 40 transmits a command for controlling the operation of the external charging and discharging device 30.

From electrified vehicle 20, the servers 40 acquire, as various types of information, the connection information with the external charging and discharging device 30, the position information of electrified vehicle 20, the charging and discharging execution state of the battery 24, the remaining charge SOC [%] of the battery 24, and the like. The connection information with the external charging and discharging device 30 is information indicating a plug-connection status in which electrified vehicle 20 is connected to any one of the charging/discharging stands 32. The position information of electrified vehicle 20 is self-vehicle position information indicating the position (for example, latitude and longitude) of the electrified vehicle 20 based on of Global Positioning System (GPS) signals (orbit signals) transmitted by GPS satellites. The charging and discharging execution state of the battery 24 includes a charging state, a discharging state, and a charging and discharging standby state. The state of charge of the battery 24 is a state in which the battery 24 is charged via the external charging and discharging device 30. The discharge state of the battery 24 is a state in which the battery 24 is discharged through the external charging and discharging device 30. The charging/discharging standby state of the battery 24 is a state in which the battery 24 stands by for charging/discharging via the external charging and discharging device 30. The charging and discharging execution state of the battery 24 is synonymous with the status of the battery 24. The remaining charge SOC of the battery 24 indicates the state of charge of the battery 24.

The servers 40 acquire, as various types of information from the external charging and discharging device 30, connection information with electrified vehicle 20, position information of the external charging and discharging device 30, charging and discharging execution state of the battery 24, and remaining charge SOC of the battery 24. The connection information with electrified vehicle 20 is information indicating a vehicle-connection status in which any one of electrified vehicle 20 is connected to the charging/discharging stand 32. The position information of the external charging and discharging device 30 is, for example, information indicating a position (for example, latitude and longitude) of the external charging and discharging device 30 stored in advance. The position information of the external charging and discharging device 30 may be stored or registered in the server 40 in advance, for example. The charging and discharging execution state of the battery 24 acquired from the external charging and discharging device 30 includes, in addition to the charging state, the discharging state, and the charging and discharging standby state, the magnitude of the charging and discharging power in a state in which one of the charging state and the discharging state of the battery 24 is set. The remaining charge SOC acquired from the external charging and discharging device 30 is the remaining charge SOC acquired from electrified vehicle 20 where the external charging and discharging device 30 is connected to the charging/discharging stand 32. The various types of information acquired from the external charging and discharging device 30 may include, for example, the battery capacity of the battery 24.

The servers 40 reference the various kinds of information acquired from electrified vehicle 20 with the various kinds of information acquired from the external charging and discharging device 30 to identify electrified vehicle 20 connected to the external charging and discharging device 30. For example, when electrified vehicle 20 is connected to the charging/discharging stand 32, the servers 40 determine whether or not there is an electrified vehicle 20 in the vicinity of the external charging and discharging device 30 based on the position data of electrified vehicle 20. The vicinity of the external charging and discharging device 30 is, in other words, the vicinity of the station 50 that owns electrified vehicle 20 and the external charging and discharging device 30. When there is an electrified vehicle 20 in the vicinity of the station 50, the servers 40 determine whether or not the charging and discharging execution state and the remaining charge SOC acquired from electrified vehicle 20 coincide with the charging and discharging execution state and the remaining charge SOC acquired from the external charging and discharging device 30 to which electrified vehicle 20 is connected. When the servers 40 determine that both are identical, they determine that electrified vehicle 20 and the external charging and discharging device 30 are identical. The servers 40 identify which of a plurality of electrified vehicle 20 owned by electrified vehicle 20 connected to the external charging and discharging device 30 is.

In this way, the servers 40 identify electrified vehicle 20 owned by the same station 50 as the external charging and discharging device 30, which is connected to the external charging and discharging device 30. That is, the servers 40 associate electrified vehicle 20 with the charging/discharging stands 32, and determine which electrified vehicle 20 is connected to which of the charging/discharging stands 32. The servers 40 have an authenticating function of associating electrified vehicle 20 with the charging/discharging stands 32. Since the external charging and discharging device 30 cannot acquire the identification number unique to the vehicle from electrified vehicle 20, the servers 40 can acquire the identification number unique to the vehicle from electrified vehicle 20. However, the server 40 cannot acquire the identification number unique to the vehicle from the external charging and discharging device 30.

Incidentally, it is difficult to determine which electrified vehicle 20 is connected to which charging/discharging stand 32 when the charging and discharging execution state and the remaining charge SOC of the plurality of electrified vehicle 20 connected to the plurality of external charging and discharging devices 30 provided nearby are the same. In such cases, the servers 40 transmit commands to the state acquisition controllers 34 to make the charging and discharging execution states different between electrified vehicle 20.

That is, when it is determined that the discharging execution status and the remaining charge SOC of at least two electrified vehicle 20 among electrified vehicle 20 connected to the external charging and discharging device 30 are the same, the servers 40 control the external charging and discharging device 30. The external charging and discharging device 30 is controlled so that the charging and discharging execution state is different between electrified vehicle 20 determined to have the same charging and discharging execution state and the same remaining charge SOC.

Figure 2:
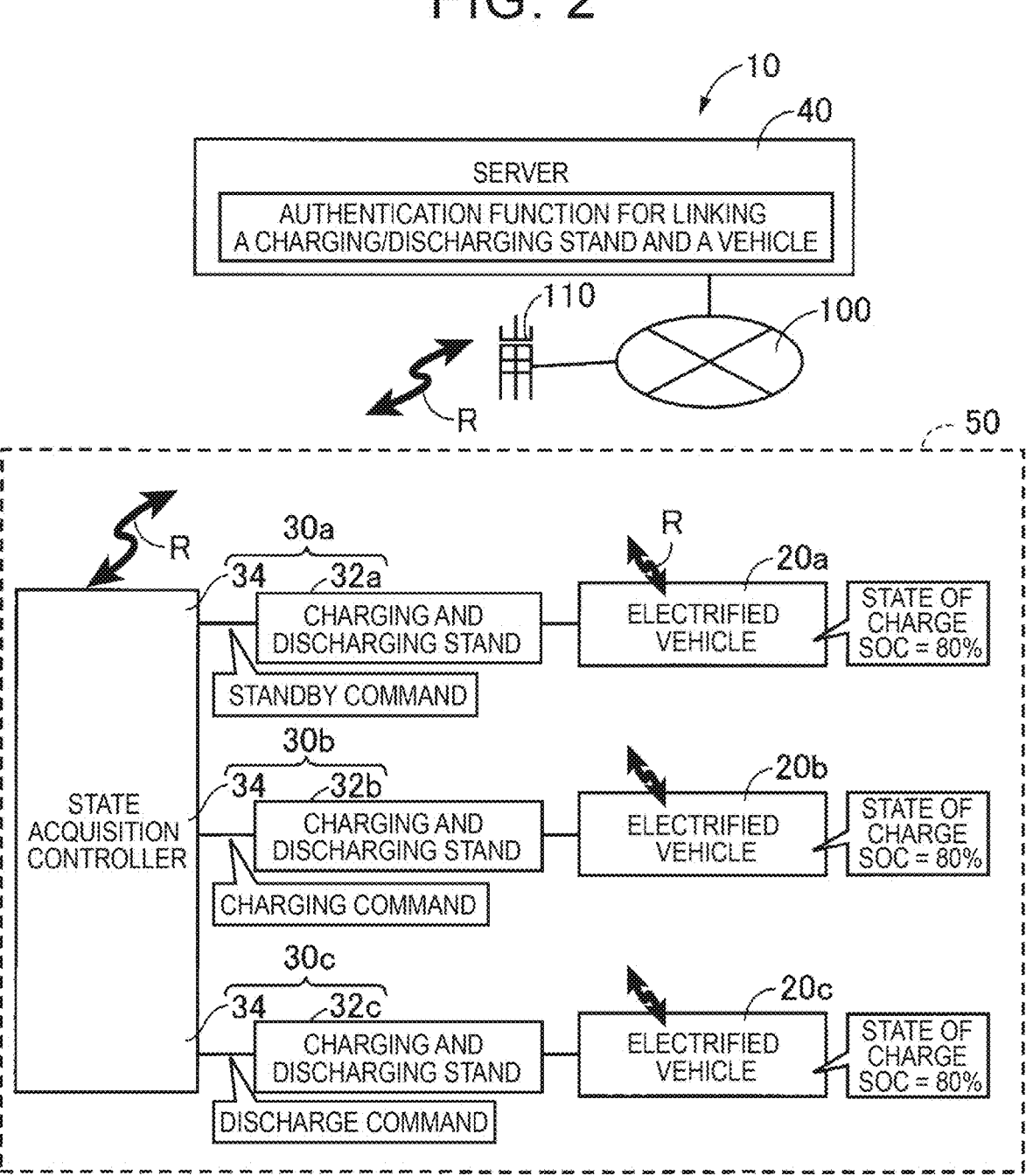
FIG. 2 is a diagram for explaining an exemplary case in which charging and discharging execution states are made different between electrified vehicle.

FIG. 2 is a diagram for explaining an exemplary case in which charging and discharging execution states are made different between electrified vehicle 20. In FIG. 2, electrified vehicle 20 (20a, 20b, 20c) is connected to an external charging and discharging device 30 (30a, 30b, 30c in the same station 50. In electrified vehicle 20, the charging and discharging execution state is a charge state, the remaining charge SOC is set to 80 [%], and the discharge execution state and the remaining charge SOC are the same. Therefore, in order to associate electrified vehicle 20 with the charging/discharging stand 32, a standby command for switching the charging and discharging execution state to the charging/discharging standby state in the first charging/discharging stand 32a is transmitted from the server 40 to the state acquisition controller 34. In addition, a charge command for maintaining the charging and discharging execution state in the charge state in the second charge/discharge stand 32b is transmitted from the server 40 to the state acquisition controller 34. Further, a discharge command for switching the charging and discharging execution state to the discharge state in the third charge/discharge stand 32c is transmitted from the server 40 to the state acquisition controller 34. Since the charging state, the discharging state, and the charging/discharging standby state are different between electrified vehicle 20, it is determined which electrified vehicle 20 is connected to which charging/discharging stand 32.

As described above, the servers 40 make the charging and discharging execution states different between electrified vehicles 20 by making the charge state, the discharge state, and the charge/discharge standby state of the electrified vehicles 20 different from each other. The servers 40 identify electrified vehicle 20 connected to the external charging and discharging device 30 based on the difference between the charging state, the discharging state, and the charging/discharging standby state.

Figure 3:
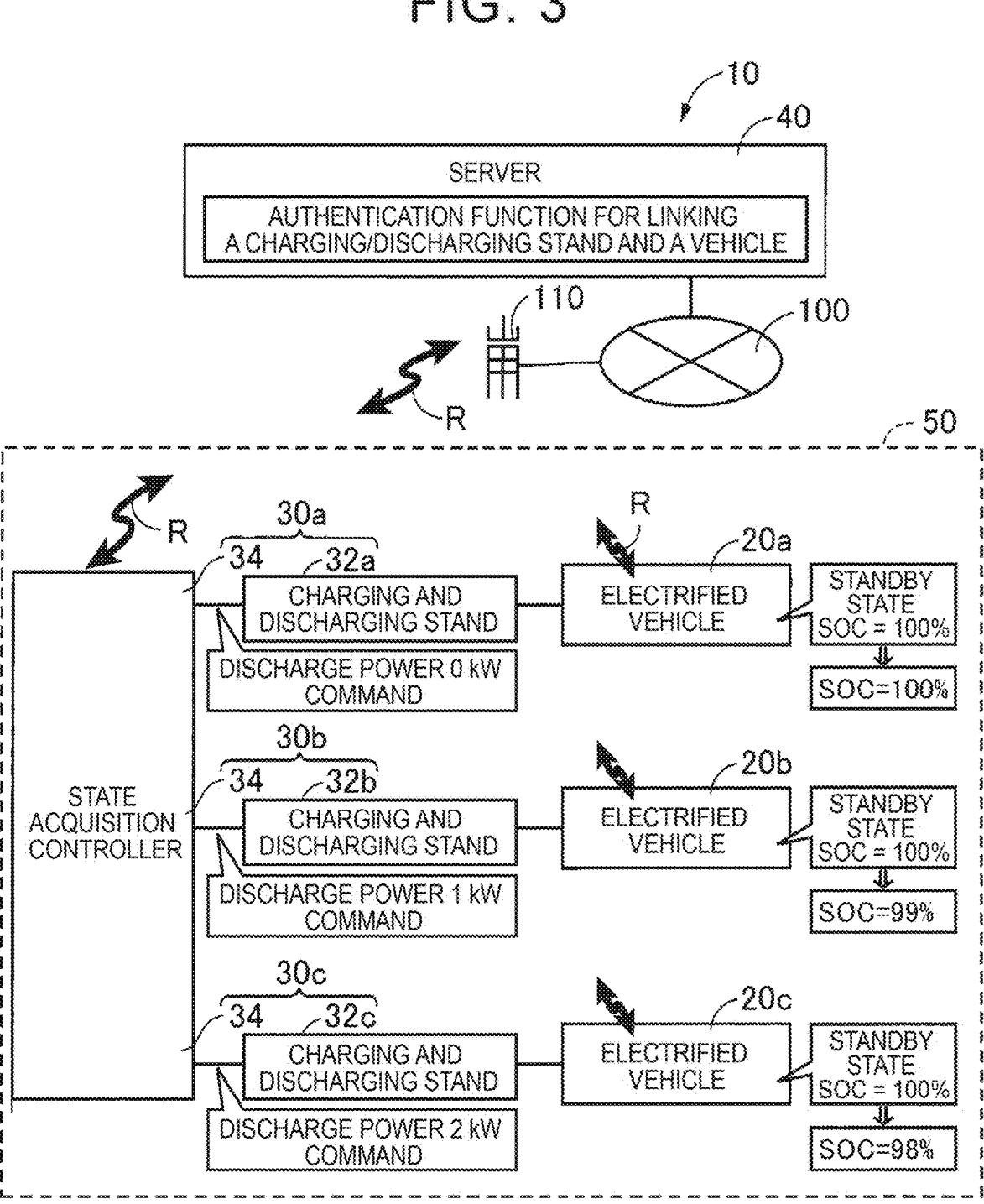
FIG. 3 is a diagram for explaining an exemplary case in which charging and discharging execution states are made different between electrified vehicle, and is an embodiment different from that of FIG. 2.

FIG. 3 is a diagram for explaining an exemplary case in which charging and discharging execution states are made different between electrified vehicle 20, and is a different embodiment from that of FIG. 2. In FIG. 3, electrified vehicle 20 (20a, 20b, 20c) is connected to an external charging and discharging device 30 (30a, 30b, 30c) in the same station 50. In electrified vehicle 20, the charging and discharging execution state is the charge/discharge standby state, the remaining charge SOC is 100 [%], and the discharge execution state and the remaining charge SOC are the same. Therefore, in order to associate electrified vehicle 20 with the charging/discharging stand 32, a command is transmitted from the server 40 to the state acquisition controller 34. The command is a command for switching the charging and discharging execution state to the discharge state and setting the discharge power to 0 [KW] in the first charge/discharge stand 32a. In addition, a command for switching the charging and discharging execution state to the discharge state and setting the discharge power to 1 [KW] in the second charge/discharge stand 32b is transmitted from the server 40 to the state acquisition controller 34. Further, in the third charging/discharging stand 32c, a command for switching the charging and discharging execution state to the discharging state and setting the discharging power to 2 [KW] is transmitted from the server 40 to the state acquisition controller 34. After a while, the remaining charge SOC of the second vehicle 20b connected to the second charging/discharging stand 32b is changed to 99 [%], and the remaining charge SOC of the third vehicle 20c connected to the third charging/discharging stand 32c is changed to 98 [%]. As a result, the charging and discharging execution state is the same charge state between electrified vehicle 20, but the remaining charge SOC is different. Therefore, it is determined which electrified vehicle 20 is connected to which charging/discharging stand 32. When the remaining charge SOC is low, a charge command differing in charge power is transmitted from the servers 40.

In this way, the servers 40 make electrified vehicle 20 have different magnitudes of charge/discharge power in the state of being one of the charge state and the discharge state. As a result, the charging and discharging execution state is made different between electrified vehicle 20. Then, the servers 40 identify electrified vehicle 20 connected to the external charging and discharging device 30 based on the difference in the remaining charge SOC that is changed in accordance with the difference in the charging/discharging power.

Figure 4:
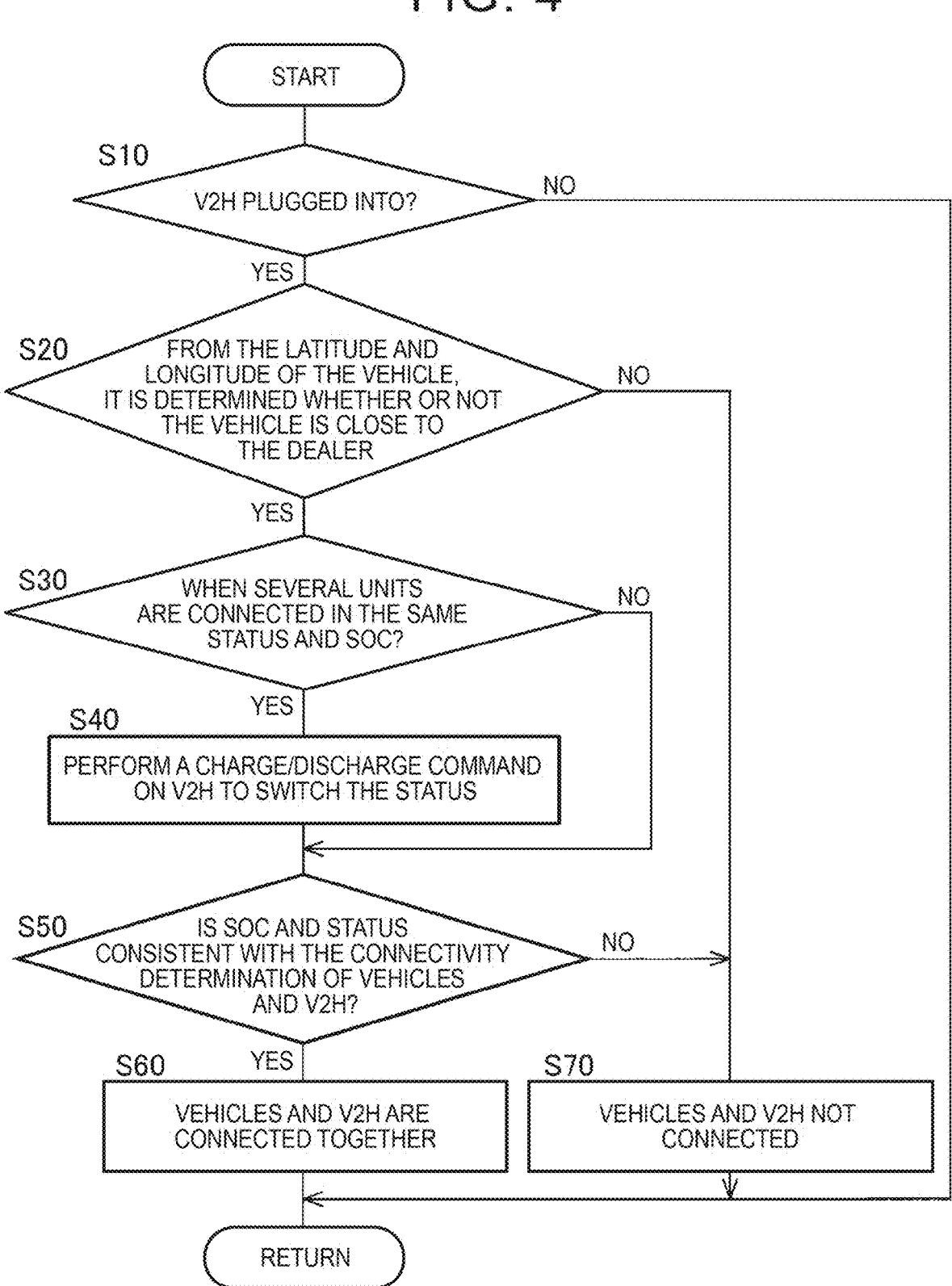
FIG. 4 is a flow chart for explaining a main part of a control operation of the servers, and is a flow chart for explaining a control operation for appropriately identifying an electrified vehicle connected to the external charging and discharging device.

FIG. 4 is a flowchart for explaining a main part of the control operation of the server 40. FIG. 4 is a flow chart for explaining a control operation for appropriately identifying an electrified vehicle 20 connected to the external charging and discharging device 30, and is repeatedly executed, for example.

In FIG. 4, each step of the flowchart corresponds to a function of the server 40. In the step (hereinafter, step is omitted) S10, it is determined whether or not electrified vehicle 20 is connected to a certain charging/discharging station. For example, it is determined whether or not a V2H plug from a charging/discharging station is connected to electrified vehicle 20. If the determination of this S10 is negative, the routine is terminated. If the determination of this S10 is affirmative, it is determined in S20 whether electrified vehicle 20 is close to the station 50 that owns electrified vehicle 20 based on the location of electrified vehicle 20. If the determination of S20 is affirmative, it is determined in S30 whether there are a plurality of electrified vehicle 20 connected to the external charging and discharging device 30 of the same station 50, and whether or not the discharging execution status and the remaining charge SOC in at least two electrified vehicle 20 are the same. If the determination of S30 is affirmative, in S40, a command is transmitted to the state acquisition controllers 34 to change the charging and discharging execution state of electrified vehicle 20 determined to have the same discharge execution state and the same remaining charge SOC. If the determination of S30 is negative, or after S40, it is determined in S50 whether or not the various information acquired from electrified vehicle 20 matches the various information acquired from the external charging and discharging device 30. When the determination of S50 is affirmative, electrified vehicle 20 connected to the charge/discharge stand 32 is identified in S60. When the determination of S20 is negative, or when the determination of S50 is negative, electrified vehicle 20 connected to the charge/discharge stand 32 is not identified in S70.

Here, when electrified vehicle 20 and the charging/discharging stand 32 are associated with each other, the remaining charge SOC can be managed. In this case, for example, the remaining charge SOC can be managed in accordance with the user's manipulation of setting the remaining charge SOC to 100 [%] by the specified time in the charge setting of electrified vehicle 20. Alternatively, when the discharge execution status and the remaining charge SOC of electrified vehicle 20 connected to the adjacent charge/discharge stand 32 are the same, the remaining charge SOC can be managed.

In this case, it is possible to manage the remaining charge SOC in accordance with the user's manipulation of setting electrified vehicle 20 to be charged preferentially in order to start earlier, and setting the other one to the discharging state or the charging/discharging standby state. Alternatively, the power used in the station 50 may be managed. In this case, the remaining charge SOC can be managed in accordance with a user operation of supplying electric power from electrified vehicle 20 to the electric equipment 120 and 130 (refer to FIG. 5) in the station 50 by electrified vehicle 20 discharging setting, for example. Here, the user is, for example, an administrator of the station 50.

Figure 6:
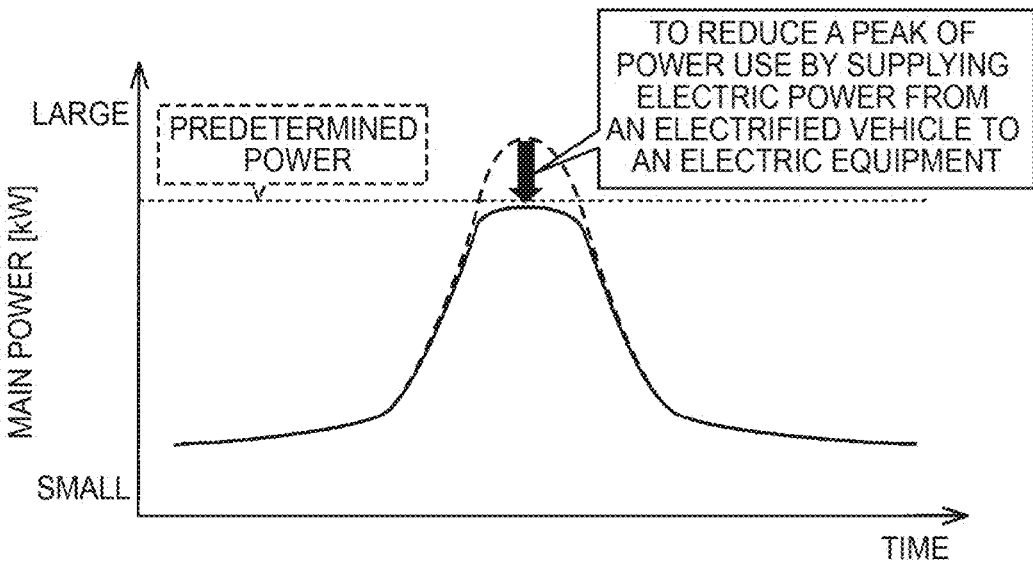
FIG. 6 is a diagram for explaining an example of the management of the main power in the station.

FIG. 5 is a diagram illustrating an example of equipment in the station 50. FIG. 6 is a diagram for explaining an example of the management of the main power in the station 50. In FIG. 5, electrified vehicle 20 and the external charging and discharging device 30 are owned together with the electric equipment 120 and 130 that use the main power at the station 50 that receives the main power from the public power system 200. The electric equipment 120 and 130 are, for example, air conditioners. The maximum value of the main power used in the station 50 is preferably a predetermined power, for example, a contract power or less. Therefore, in a period in which it is assumed that the peak of the main power to be used exceeds the predetermined power, as shown in FIG. 5, for example, a discharge command for setting the charging and discharging execution state to the discharge state in the first charge/discharge stand 32a is transmitted from the server 40 to the state acquisition controller 34. Electric power from the battery 24 of the first vehicle 20a is supplied to the electric equipment 120 and 130. As a result, as shown in FIG. 6, the peak of the main power is set to be equal to or less than the predetermined power. The vehicle 20 serving as a source of the electric power supplied to the electric equipment 120 and 130 is selected by considering, for example, a remaining charge SOC, a future vehicle usage state, and the like.

As described above, the server 40 causes the external charging and discharging device 30 to supply the discharged electric power from electrified vehicle 20 that is identified to be connected to the external charging and discharging device 30 to the electric equipment 120 and 130 in place of some or all of the main electric power used in the electric equipment 120 and 130 so that the maximum value of the main electric power used in the station 50 is equal to or less than the predetermined electric power.

As described above, according to the present embodiment, electrified vehicle 20 connected to the external charging and discharging device 30 is identified by referencing various kinds of information acquired from electrified vehicle 20 with various kinds of information acquired from the external charging and discharging device 30. As a result, even when a plurality of external charging and discharging devices 30 are installed in the vicinity of each other, electrified vehicle 20 connected to the external charging and discharging device 30 can be appropriately identified. In addition, the external charging and discharging device 30 is controlled so that the charging and discharging execution states are different between electrified vehicle 20 connected to the external charging and discharging device 30 when it is determined that the charging and discharging execution state and the remaining charge SOC of the electrified vehicles 20 are the same. This makes it possible to appropriately identify electrified vehicle 20 connected to the external charging and discharging device 30 even when the charging and discharging execution state and the remaining charge level of electrified vehicle 20 are the same. Therefore, electrified vehicle 20 connected to the external charging and discharging device 30 can be appropriately identified.

In addition, according to the present embodiment, the state of charge, the state of discharge, and the state of charge/discharge standby are made different between electrified vehicle 20, so that the charging and discharging execution state is made different between electrified vehicle 20. Then, electrified vehicle 20 connected to the external charging and discharging device 30 is identified based on the difference between the charging state, the discharging state, and the charging/discharging standby state. This makes it possible to appropriately identify electrified vehicle 20 connected to the external charging and discharging device 30 even when the charging and discharging execution state and the remaining charge level of electrified vehicle 20 are the same.

Further, according to the present embodiment, the magnitude of the charge/discharge power in the state of being one of the charge state and the discharge state is made different between electrified vehicle 20. As a result, the charging and discharging execution state is made different between electrified vehicle 20. Then, electrified vehicle 20 connected to the external charging and discharging device 30 is identified based on the difference in the remaining charge SOC that is changed in accordance with the difference in the charging/discharging power. This makes it possible to appropriately identify electrified vehicle 20 connected to the external charging and discharging device 30 even when the charging and discharging execution state and the remaining charge level of electrified vehicle 20 are the same.

Further, according to the present embodiment, electrified vehicle 20 and the external charging and discharging device 30 are owned for each of the plurality of stations 50. The servers 40 are connected to each of electrified vehicle 20 and the external charging and discharging device 30 via radio communication. Thus, electrified vehicle 20 connected to the external charging and discharging device 30 can be appropriately identified for each station 50.

Further, according to the present embodiment, the discharging power from electrified vehicle 20 whose connection with the external charging and discharging device 30 is identified is supplied by the external charging and discharging device 30 to the electric equipment 120 and 130 instead of part or all of the main power used in the electric equipment 120 and 130. Thereby, it is avoided or suppressed that the maximum value of the main power used in the station 50 exceeds the predetermined power.

Although the embodiments of the present disclosure have been described in detail with reference to the drawings, the present disclosure is also applied to other aspects.

For example, in the above-described embodiment, the servers 40 are exemplified as external control devices different from electrified vehicle 20 and the external charging and discharging device 30, but the present disclosure is not limited to this embodiment. For example, the external control device may be a computer owned by each of the stations 50. Electrified vehicle 20 and the external charging and discharging device 30 are not connected to the network 100, and the present disclosure can be applied to each of the stations 50.

It should be noted that the above-described embodiment is merely one embodiment, and the present disclosure can be implemented in a manner in which various modifications and improvements are made based on the knowledge of a person skilled in the art.

What is claimed is:

1. A vehicle referencing system, comprising:

a plurality of electrified vehicles, each equipped with a battery for exchanging electric power with an electric motor serving as a motive power source;

a plurality of external charging and discharging devices that is fixedly installed, and that enables charging and discharging of the batteries by the electrified vehicles being connected; and an external control device that is different from the electrified vehicles and the external charging and discharging devices, and that acquires various types of information from each of the electrified vehicles and the external charging and discharging devices via communication and also controls operations of the external charging and discharging devices, wherein:

the external control device identifies the electrified vehicles that are connected to the external charging and discharging devices, by referencing connection information of connection to the external charging and discharging devices, position information of the electrified vehicles, charging and discharging execution state of the batteries, and remaining charge of the batteries, as the various types of information that are acquired from the electrified vehicles, and connection information of connection to the electrified vehicles, position information of the external charging and discharging devices, the charging and discharging execution state, and the remaining charge, as the various types of information that are acquired from the external charging and discharging devices; and when the external control device determines that the charging and discharging execution state and the remaining charge of at least two electrified vehicles among the electrified vehicles that are each connected to the external charging and discharging devices are the same, the external control device controls the external charging and discharging devices such that the charging and discharging execution state is different between the electrified vehicles regarding which the charging and discharging execution state and the remaining charge are determined to be the same.

2. The vehicle referencing system according to claim 1, wherein:

the external control device causes the charging and discharging execution state to be different between the electrified vehicles, by causing a charging state, a discharging state, and a charging and discharging standby state, that are included in the charging and discharging execution state, to be different between the electrified vehicles; and the external control device identifies the electrified vehicles connected to the external charging and discharging devices based on a difference in the charging state, the discharging state, and the charging and discharging standby state.

3. The vehicle referencing system according to claim 1, wherein:

the external control device causes the charging and discharging execution state to be different between the electrified vehicles, by causing a magnitude of charging and discharging electric power to be different between the electrified vehicles in a state of being set to one of a charging state and a discharging state that are included in the charge and discharge execution state that is acquired from the external charging and discharging devices; and the external control device identifies the electrified vehicles that are connected to the external charging and discharging devices based on a difference in the remaining charge that is caused to change in accordance with a difference in the charging and discharging electric power.

4. The vehicle referencing system according to claim 1, wherein:

the electrified vehicles and the external charging and discharging devices are owned by each of a plurality of stations;

the external control device is a server that is connected to each of the electrified vehicles and the external charging and discharging devices via wireless communication; and the server identifies the electrified vehicles owned by the same station as the external charging and discharging devices, regarding which the electrified vehicles are connected to the external charging and discharging devices.

5. The vehicle referencing system according to claim 1, wherein:

the electrified vehicles and the external charging and discharging devices are owned together at stations at which main electric power is supplied from a public electric power system, along with electric equipment that uses the main electric power; and the external control device causes the external charging and discharging devices to supply discharging electric power from the electrified vehicles regarding which connection to the external charging and discharging devices is identified, to the electric equipment in place of part or all of the main electric power used by the electric equipment, such that a maximum value of the main electric power used in the stations is no greater than a predetermined electric power.

* * * * *